United States Patent

Schaefer et al.

[11] Patent Number: 5,190,362
[45] Date of Patent: Mar. 2, 1993

[54] PRESSURE LIMITING VALVE WITH UNCOUPLED VALVE CLOSING BODY AND TAPPET

[75] Inventors: Ernst-Dieter Schaefer, Gerlingen; Klaus Mueller, Tamm, both of Fed. Rep. of Germany

[73] Assignee: Robert Bosch GmbH, Stuttgart, Fed. Rep. of Germany

[21] Appl. No.: 726,675

[22] Filed: Jul. 8, 1991

[30] Foreign Application Priority Data

Sep. 26, 1990 [DE] Fed. Rep. of Germany ....... 4030424

[51] Int. Cl.$^5$ .................... F15B 13/042; B60T 7/32; B60T 8/46
[52] U.S. Cl. .................... 303/113.2; 303/DIG. 2; 303/84.1; 137/539.5
[58] Field of Search ............. 303/117, 9.62, 9.75, 303/113 AP, 113 TR, 84.1, 116 R, 116 SP, DIG. 1, DIG. 2, DIG. 6, 115 PP; 137/539.5

[56] References Cited

U.S. PATENT DOCUMENTS

| 2,470,372 | 5/1949 | Roth | 137/539.5 |
| 3,175,582 | 3/1965 | London | 137/539.5 X |
| 3,236,256 | 2/1966 | Valentine | 137/539.5 X |
| 4,123,118 | 10/1978 | Sato | 303/115 R |
| 4,783,125 | 11/1988 | Belart et al. | 303/116 R X |

FOREIGN PATENT DOCUMENTS 2223813 4/1990 United Kingdom ......... 303/115 PP

Primary Examiner—Douglas C. Butler
Assistant Examiner—Josie A. Ballato
Attorney, Agent, or Firm—Edwin E. Greigg; Ronald E. Greigg

[57] ABSTRACT

A pressure limiting valve has a valve closing member (ball), which is subjected to a hydraulic opening force and is indirectly subjected to a closing force generated by a compression spring which avoids hysteresis that impairs the switching behavior of the pressure limiting valve. A tappet, which passes through a sealing ring and is exposed to a control pressure, is also capable of acting in a closing manner upon the pressure limiting valve. When there is no operative control pressure, the tappet is pushed back by the opening of the pressure limiting valve and is retained in this position by frictional forces brought about by a sealing ring. The switching plays of the pressure limiting valve are free of frictional forces. The pressure limiting valve is suitable for use in hydraulic motor vehicle brake systems.

1 Claim, 2 Drawing Sheets

PRESSURE LIMITING VALVE WITH UNCOUPLED VALVE CLOSING BODY AND TAPPET

BACKGROUND OF THE INVENTION

The invention is based on a pressure limiting valve as defined hereinafter.

A pressure limiting valve of this type for use in a hydraulic motor vehicle brake system has already been created, which serves to limit the operating pressure generated by a pump in the traction control mode by diverting pressure fluid, pumped in a brake line segment to a supply tank via the pressure limiting valve. The pressure limiting valve is therefore a switch element that opens the brake circuit. In the normal braking mode, in which the brake pressure is generated by actuation of a master brake cylinder, however, it must be assured that no pressure fluid escape from the brake circuit via the pressure limiting valve. This is reinforced by imposing the brake pressure acting as control pressure upon the tappet at the third connection of the pressure limiting valve. However, since the tappet of the pressure limiting valve is firmly connected to the valve closing body and is exposed to frictional forces at the sealing ring, the switching behavior of the valve upon limiting the pump work pressure is impaired by hysteresis.

OBJECT AND SUMMARY OF THE INVENTION

The pressure limiting valve according to the invention, has an advantage over the prior art that the switching behavior of the valve is unaffected by major forces acting upon the tappet, since the valve closing body and the tappet are uncoupled from one another. When the pressure limiting valve is opened, the tappet is in fact pushed back, and is held in this position by the sealing ring until such time as control pressure becomes operative at the third connection and moves the tappet back toward the valve closing body.

With the provisions set forth herein, a favorable coupling of the tappet to the valve closing member in terms of force is advantageously attained, and the bearing of the tappet and valve closing member with low tilting moment is also attained.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
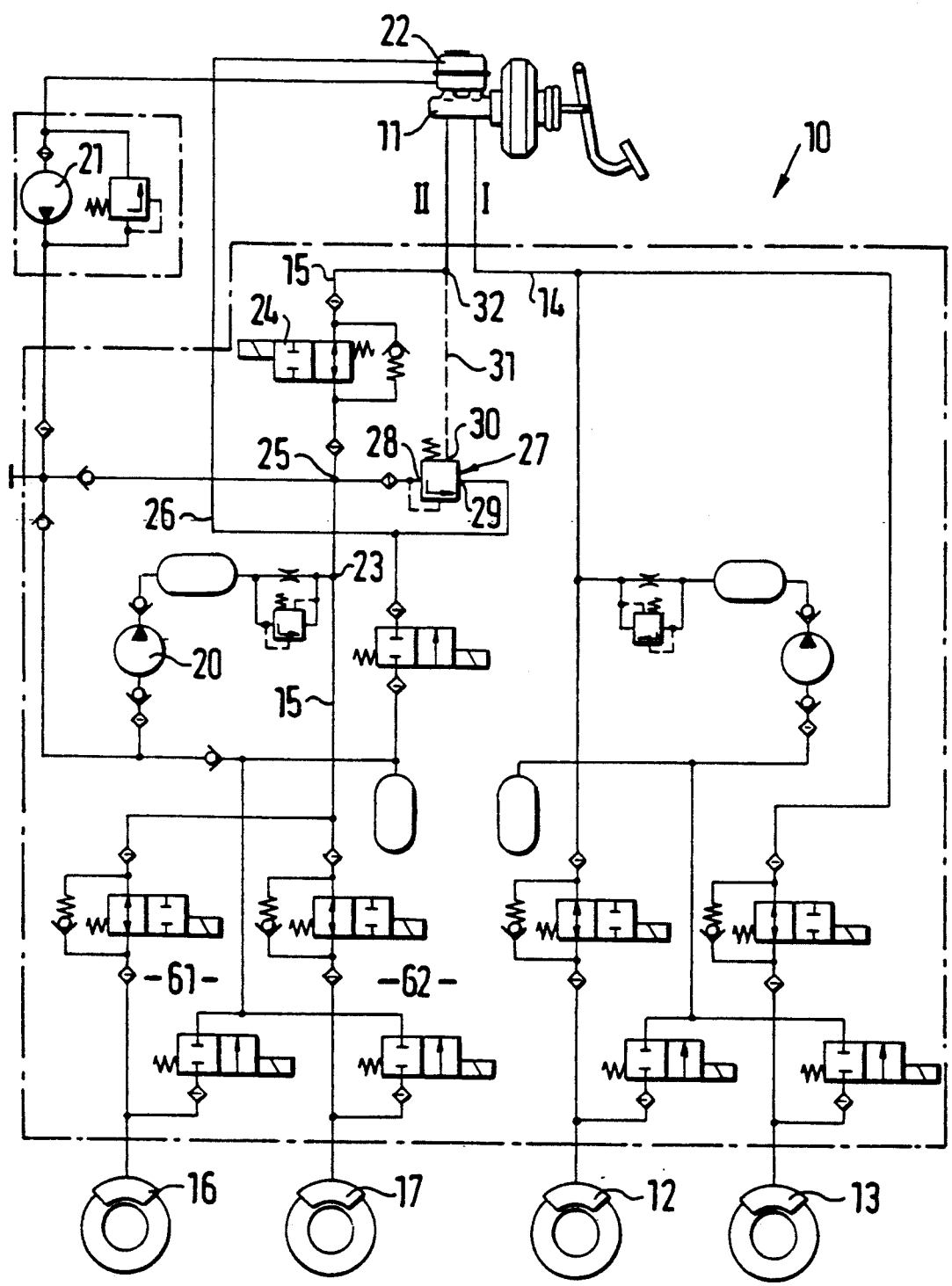
FIG. 1 is a circuit diagram of a motor vehicle brake system having a pressure limiting valve connected to a brake line.

The hydraulic motor vehicle brake system 10 shown in FIG. 1 has a pedal-actuatable master brake cylinder 11, to which two brake circuits I and II are connected. The brake circuit I has a brake line 14 leading from the master brake cylinder 11 to wheel brakes 12 and 13 of nondriven vehicle wheels. A brake line 15 of brake circuit II communicates with wheel brakes 16 and 17 of driven vehicle wheels. Upon actuation of the master brake cylinder 11, brake pressure can be generated in the wheel brakes 12, 13, 16 and 17 by the displacement of quantities of pressure fluid through the brake lines 14 and 15.

The brake system 10 is also equipped with an apparatus for traction control, which is associated with one of the driven vehicle wheels. To this end, the brake system 10 has a high-pressure pump 20, to which pressure fluid can be supplied by a second pump 21, from a pressure fluid supply tank 22 of the master brake cylinder 11. On the outlet side, the pump 20 communicates with the brake line 15 at the connection point 23. So that the pump 20 can build up the brake pressure in the wheel brakes 16 and 17, a blocking valve 24 is disposed in the brake line 15 between the master brake cylinder 11 and the connection point 23. Between this blocking valve 24 and the connection point 23, a return line 26 for pressure fluid begins at the brake line 15 at the connection point 25 and extends to the supply tank 22. A pressure limiting valve 27 is disposed in the return line 26, and with it the operating pressure that can be generated by the pump 20 can be limited, by diverting quantities of pressure fluid to the pressure fluid supply tank 22 The pressure limiting valve 27 has a first connection 28 for the return line 26 coming from the brake line 15. The return line 26 is continued to the pressure fluid supply tank 22 from a second connection 29 of the pressure limiting valve 27. The pressure limiting valve 27 also has a third connection 30 for a control line 31, which is brought from a connection point 32 of the brake line 15 located between the master brake cylinder 11 and the blocking valve 24.

Figure 2:
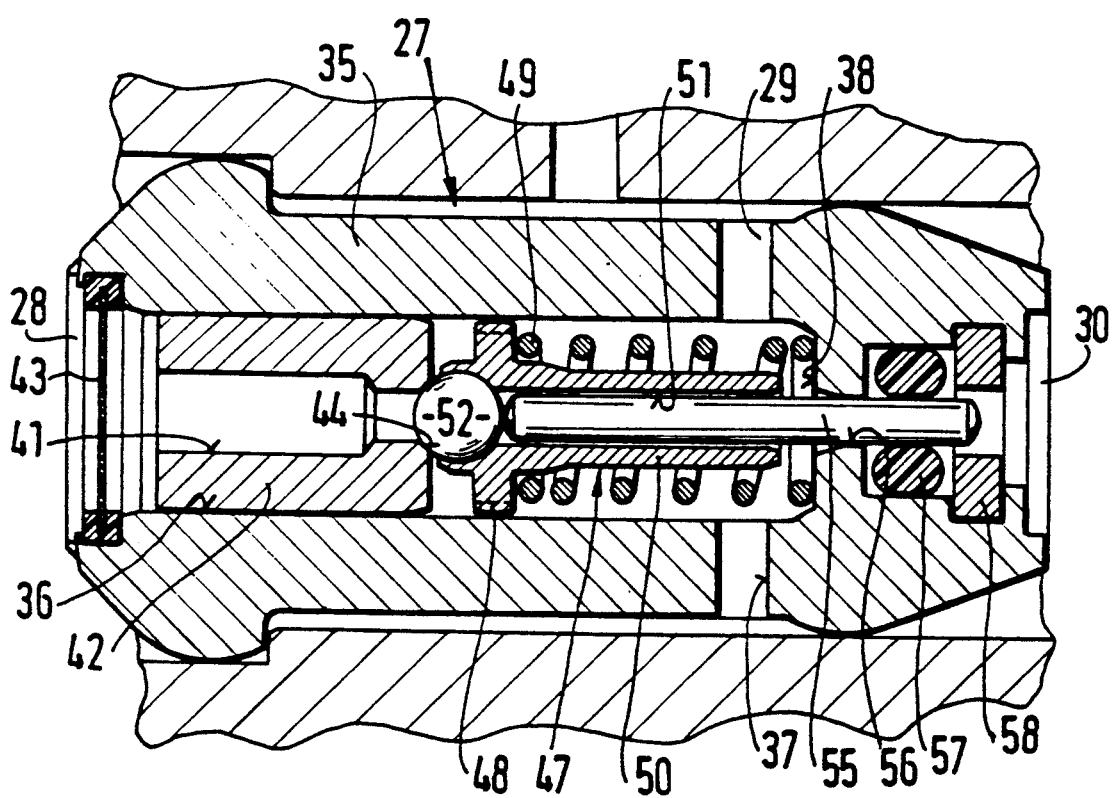
FIG. 2 is a longitudinal section through the pressure limiting valve.

The physical embodiment of the pressure limiting valve 27 is shown in FIG. 2:

The pressure limiting valve 27 has a housing 35 with a stepped longitudinal bore 36. On the left-end of the longitudinal bore 36 as seen in the drawing, there is the first connection 28 for the return line 26. Its second connection 29 is provided by a transverse bore 37 that intersects the longitudinal bore 36 near a bore shoulder 38. The third connection 30 for the control line 31 is located spaced apart from the right-hand end of the longitudinal bore 36.

From the first connection 28, a valve seat body 42 that also has a longitudinal bore 41 is pressed into the longitudinal bore 36 of the housing 35. A filter body 43 that closes off the longitudinal bore 36 toward the first connection 28 precedes the valve seat body 42. The valve seat body 42 is provided with a valve seat 44 on the end portion of the longitudinal bore 41 toward the bore shoulder 38.

Between the valve seat body 42 and the bore shoulder 38 in the longitudinal bore 36 of the housing 35 is a valve closing body 47, which has a guide collar 48 toward the valve seat. This collar 48 is engaged by a pre-stressed compression spring 49, which is supported on the bore shoulder 38. The valve closing body 47 has a cylindrical extension 50 of lesser diameter, beginning at the guide collar 48 and extending toward the bore shoulder 38, and a continuous longitudinal bore 51. In the region of the collar 48, this bore 51 is closed off by a ball 52 received at the valve closing body 47 and serving as the valve closing member associated with the valve seat 44. The longitudinal bore may alternatively be embodied as a blind bore that ends before the ball 52.

A tappet 55 embodied as a smooth cylindrical pin is received in the longitudinal bore 51 of the valve closing body 4 and extends past the bore shoulder 3 almost to the third connection 30 of the pressure limiting valve 27. Near the bore shoulder 38, the tappet 55 is supported in a guide segment 56 adjoining the longitudinal bore 36. A sealing ring 57 through which the tappet 55 passes and a retaining disk 58 are received in the housing 35 of the pressure limiting valve 27 between this guide segment 56 and the third connection 30. As can be clearly seen from FIG. 2, all the elements of the pressure limiting valve 27 received in the longitudinal bore 36 of the housing 35 are disposed coaxially.

In cooperation with the motor vehicle brake system 10, the pressure limiting valve 27 has the following mode of operation:

Upon driver-initiated braking of the motor vehicle, the first connection 28 and the third connection 30 of the pressure limiting valve 27 are acted upon by pressure. Toward the valve seat, an opening force acts upon the valve closing body 47, and this force is compensated for by the closing force of the compression spring 49. The compression spring 49, which by its prestressing determines the response pressure of the pressure limiting valve 27, is reinforced by an additional closing force that the control pressure at the third connection 30 exerts o the free face end of the tappet 55. This additional closing force is transmitted by the tappet 55 to the ball 52 of the valve closing body 47, which additionally acts in a closing direction on the pressure limiting valve 27. This reliably prevents any outflow of pressure fluid from the first connection 28 to the second connection 29 of the pressure limiting valve 27.

In the traction control mode, the blocking valve 24 closes and blocks the communication between the master brake cylinder 11 and the wheel brakes 16 and 17,,so that the turned-on pump 20 can generate brake pressure. Since the vehicle driver is not initiating braking in this case, no control pressure is operative at the third connection 30 of the pressure limiting valve 27. Contrarily, at the first connection 28 of the pressure limiting valve 27, the pump 20 generates an operating pressure that exceeds the response pressure of this valve, so that the closing force of the compression spring 49 is overcome, and the ball 52 moves from the valve seat 44. (The braking pressure operative at the wheel brakes 16, 17, which is lower than the operating pressure, is modulated by valve device 61 and 62.) When the ball 52 moves from the valve seat 44, the tappet 55 is also thrust back toward the third connection 30, overcoming the frictional force brought about by the sealing ring 57. Pressure fluid can now flow out from the first connection 28 to the second connection 29. In the ensuing closing process of the pressure limiting valve 27, the ball 52 is moved back into contact with the valve seat 44 by the closing force of the compression spring 49, but the tappet 55 remains in its pushed-back position. The processes of opening and closing the pressure limiting valve 27 can now proceed, unaffected by frictional forces of the sealing ring 57. Not until a braking event initiated by the driver is the tappet 55 moved back to its position shown, overcoming the frictional forces at the sealing ring 57.

By suitable dimensioning of the play between the guide collar 48 of the valve closing body 47 and the longitudinal bore 36 of the housing 35, between the guide segment 56 of the longitudinal bore 36 and the tappet 55, and between the longitudinal bore 51 of the valve closing body 47 and the tappet 55, it is assured that errors in alignment between the valve seat 44 and the ball 52 will be compensated for, and undesirable three-point bearing conditions of the movable components of the pressure limiting valve 27 will be avoided.

The foregoing relates to a preferred exemplary embodiment of the invention, it being understood that other variants and embodiments thereof are possible/-within the spirit and scope of the invention, the latter being defined by the appended claims.

What is claimed and desired to be secured By Letters Patent Of the United States Is:

1. A pressure limiting valve (27) for hydraulic motor vehicle brake systems (10), having a housing (35) having an axial bore (36) with a first connection (28) for a pressure fluid subject to operating pressure, a second connection (29) for diverted pressure fluid, and a third connection (30) exposed to control pressure;

a valve seat (44) disposed on a valve seat body (42) within said axial bore of said housing (35), said valve seat body includes a longitudinal bore that communicates with the first connection (28);

a valve closing body (47) guided longitudinally displaceably in said bore of the housing (35) counter to the force of a compression spring (49) which engages said valve closing body to force said valve closing body toward said valve seat (44), said valve closing body (47) including a second longitudinal bore;

a valve seat closing member embodied as a ball (52) secured to one end of said valve closing body for seating on said valve seat (44), and;

a tappet (55) movable in said second longitudinal bore and extending away from the valve seat closing member in a direction of motion of the valve closing body (47), said tappet includes one end that engages said valve seat closing member and one end that ends juxtaposed the third connection (30), and passes through a fixed sealing ring (57), the tappet (55) is embodied as a cylindrical pin received in said second longitudinal bore (51) of the valve closing body (47) in a manner relatively movable with respect to said valve closing body, the tappet engages the valve seat closing member solely under the influence of the control pressure and subsequent to an opening stroke of the pressure limiting valve (27), said tappet (55) in absence of control pressure in the third connection (30) is retained by said sealing ring in a position in which the tappet does not engage the valve seat closing member.

* * * * *